US005633472A

United States Patent [19]
DeWitt et al.

[11] Patent Number: 5,633,472
[45] Date of Patent: May 27, 1997

[54] METHOD AND SYSTEM USING PATHNAMES TO SPECIFY AND ACCESS AUDIO DATA AT FIDELITY LEVELS OTHER THAN THE LEVEL AT WHICH THE DATA IS STORED

[75] Inventors: Frederick J. DeWitt, Kirkland; Peter B. Stewart, Redmond, both of Wash.

[73] Assignee: Microsoft Corporation, Redmond, Wash.

[21] Appl. No.: 263,136

[22] Filed: Jun. 21, 1994

[51] Int. Cl.$^6$ .............................. G01H 7/00; H03M 7/00; G06F 17/30
[52] U.S. Cl. .................... 84/602; 369/32; 341/61; 395/601
[58] Field of Search .................... 395/600, 601, 395/616; 84/601, 603, 605, 602, 604, 653; 369/32; 341/50, 61

[56] References Cited

U.S. PATENT DOCUMENTS

| | | | |
|---|---|---|---|
| 5,367,301 | 11/1994 | Stiltner et al. | 341/144 |
| 5,367,671 | 11/1994 | Feigenbaum et al. | 395/600 |
| 5,412,808 | 5/1995 | Bauer | 395/600 |
| 5,418,321 | 5/1995 | Keller et al. | 84/606 |
| 5,430,872 | 7/1995 | Dahod et al. | 395/600 |
| 5,432,511 | 7/1995 | Sadjadian et al. | 341/61 |

OTHER PUBLICATIONS

SoundWAV CD–ROM, Data Express, Inc., 1993.
Van Wolverton, Supercharging MS–DOS, Microsoft Press, p. 194, 1986.
*Microsoft® Windows™ Multimedia Programmer's Reference*, Microsoft Press, Redmond, Washington, 1991, pp. 8——8–45.

*Primary Examiner*—Thomas G. Black
*Assistant Examiner*—Jack M. Choules
*Attorney, Agent, or Firm*—Seed and Berry LLP

[57] ABSTRACT

A method and system for dynamically converting audio data into a standard format. The method and system also provides for using a directory hierarchy to specify a fidelity level and dynamically generating the audio data at the specified fidelity level. When a drive is loaded with, for example, a CD ROM containing raw audio data, the system generates a directory hierarchy for the drive. The directory hierarchy contains sub-directories corresponding to various fidelity characteristics. For example, the system may generate a sub-directory corresponding to audio data stored in stereo format and another sub-directory corresponding to audio data stored in mono format. The system also generates a file entry in sub-directories for each track of the CD ROM. For example, the stereo sub-directory may contain a file entry for track 1 of the CD ROM and the mono sub-directory also may contain a file entry for track 1. The file in the stereo sub-directory represents the audio data in storage and the file in the mono sub-directory represents the audio data in mono. When accessing a file at a specified fidelity level (as indicated by the directory pathname), the system reads raw audio data from the CD ROM and converts the raw audio data to the fidelity level specified by the pathname.

18 Claims, 7 Drawing Sheets

Header *101*
- <RIFF>
- <Header length - 8 + 2352 * number of raw audio sectors>
- <WAVE>
- <Format Tag = 1>
- <nChannels = 2>
- <nSamples per second = 44100>
- <nAvgBytesPerSecond = 2352 * 75 = 176400>
- <nBlockAlign = 4>
- <nBitsPerSample = 16>
- <2352 * number of raw audio sectors>

Raw Audio Data *102*
<. . . Raw audio sectors from track . . .>

METHOD AND SYSTEM USING PATHNAMES TO SPECIFY AND ACCESS AUDIO DATA AT FIDELITY LEVELS OTHER THAN THE LEVEL AT WHICH THE DATA IS STORED

TECHNICAL FIELD

This invention relates generally to a computer method and system for accessing data, and more specifically, to a computer method and system for accessing audio data at various fidelity levels using a hierarchical directory structure.

BACKGROUND OF THE INVENTION

Many computer programs currently exist for manipulating digitized audio data. The computer programs provide a user with the ability to play and edit the audio data. For example, musical editing computer programs can be used to combine data from various musical compositions into new musical compositions. Standard data formats for audio data have been developed to facilitate the sharing of audio data among various computer programs.

Figure 1:
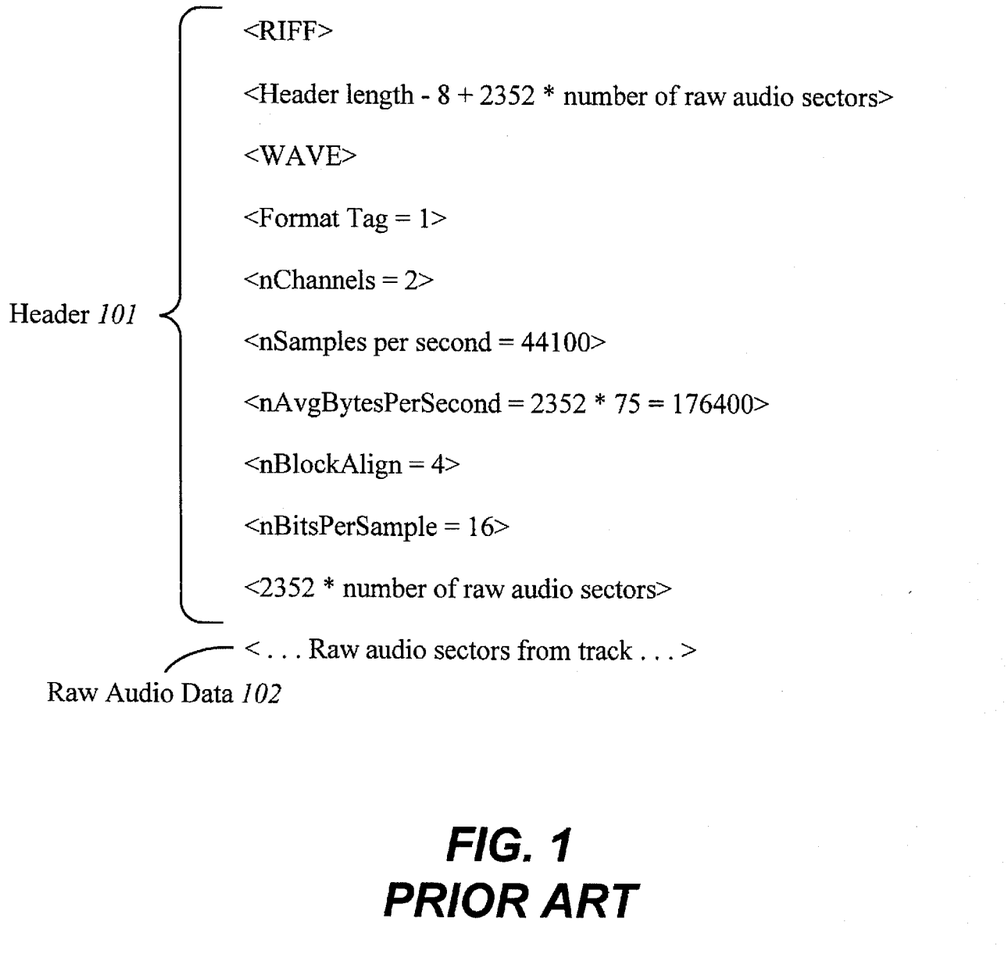
FIG. 1 illtrates portions of the prior art RIFF format of a file containing digitized audio data.

One such standard format audio data is the Resource Interchange File Format (RIFF). FIG. 1 illustrates the RIFF format. The RIFF format includes a header 101 and audio data 102. The header includes information identifying the file as being in the RIFF format (i.e., the characters RIFF); the length of the file; the file type (e.g., WAVE); the encoding format of the audio data (e.g., 1 for pulse code modulation); the number of channels used to store the audio data (e.g., 2 for stereo); the sampling rate of the raw audio data (e.g., 44100 Hz); the average number of bytes that correspond to one second of audio data (e.g., 176400); the average number of bytes in each sample (e.g., 4); the number of bits used per sample (e.g., 16); and the number of bytes of raw audio data. The header is followed by the audio data stored at the fidelity level specified by the header. The fidelity level is characterized by the number of channels (stereo/mono), the number of bits per sample, and the sampling rate. In the example of FIG. 1, the fidelity level specified is characterized as in stereo with 16 bit samples and a sampling rate of 44100 Hz.

The music industry is currently publishing many musical compositions on CD ROMs. A CD ROM typically contains a track for each musical composition recorded. A standard format that is different from the RIFF format has been defined for the recording of CD ROMs. According to this standard CD ROM format, the audio data on a CD ROM is recorded at a fidelity level that is known as the "original fidelity level."

Unfortunately, existing computer programs typically cannot access audio data that is stored in standard CD ROM format. These computer programs can typically only access audio data that is stored in the standard format for audio data, such as the RIFF format. One approach to allow a computer program to access audio data in CD ROM format would be to copy the audio data and store it in the RIFF format. However, such a copy would typically be a very large file that uses a considerable amount of disk space. Also, these computer programs often need to access audio data at various fidelity levels. However, multiple copies of the audio data at various fidelity levels would use vast amounts of disk space.

SUMMARY OF THE INVENTION

It is an object of the present invention to provide a method and system in which existing computer programs can access the audio data stored on CD ROMs.

It is another object of the present invention to provide a method and system for specifying the fidelity level at which audio data is to be accessed.

These and other objects, which will become apparent as the invention is more fully described below, are provided by a method and system for dynamically converting audio data into a standard format. The method and system also provide for using a directory hierarchy to specify a fidelity level and dynamically generating the audio data at the specified fidelity level. When a drive is loaded with, for example, a CD ROM containing raw audio data, the system generates a directory hierarchy for the drive. The directory hierarchy contains sub-directories corresponding to various fidelity characteristics. For example, the system may generate a sub-directory corresponding to audio data stored in stereo format and another sub-directory corresponding to audio data stored in mono format. The system also generates a file entry in sub-directories for each track of the CD ROM. For example, the stereo sub-directory may contain a file entry for track 1 of the CD ROM and the mono sub-directory also may contain a file entry for track 1. The file in the stereo sub-directory represents the audio data in stereo, and the file in the mono sub-directory represents the audio data in mono. When accessing a file at a specified fidelity level (as indicated by directory pathname), the system reads raw audio data from the CD ROM and converts the data to the fidelity level specified by the pathname.

DETAILED DESCRIPTION OF THE INVENTION

The present invention provides a method and system in a file system for presenting raw audio data stored on CD ROM as a set of logical files that can be accessed using standard file system commands, such as open, read, and directory. In a preferred embodiment, the file system dynamically converts raw audio data into a standard format for editing audio data ("standard editing format"), such as the RIFF format. By dynamically converting the raw audio data into the standard editing format, the audio data can be manipulated by existing audio editor applications. Furthermore, because the conversion is dynamic, the storage requirements are reduced since there is no need to store both the raw audio data and the audio data in the standard editing format. When a CD ROM is loaded in an audio drive, the file system creates a root directory for the audio drive. The root directory preferably contains a file entry corresponding to each track of the CD ROM. An editor computer program can access the audio data of a track by specifying the drive letter, the root directory, and the file name corresponding to the track to be accessed. The file system dynamically converts the raw audio data of the track to the standard editing format at the original fidelity level of the CD ROM when a file corresponding to a track is accessed. Because of this dynamic conversion, the file system need not make a copy of the audio data that is the standard editing format.

Additionally, the present invention provides a mechanism for representing the audio data at various fidelity levels without generating multiple copies of the audio data. In a preferred embodiment, the directory hierarchy is used to specify a fidelity level. The file system creates sub-directories of the root directory of the audio drive. The sub-directories contain logical files that correspond to the audio data at various fidelity levels. For example, the sub-directory with the pathname "\stereo\16 bit\44100 HZ" contains the logical files with a fidelity level characterized as stereo with 16-bit samples and a sampling rate of 44100 Hz. Similarly, the sub-directory "\mono\8 bit\11025 HZ" contains logical files with a fidelity level characterized as mono with 8-bit samples and a sampling rate of 11025 Hz. When a logical file in an audio sub-directory is accessed by an editor application, the file system dynamically converts the raw audio data of the CD ROM into the standard editing format at the fidelity level specified by the sub-directory pathname.

Figure 2A:
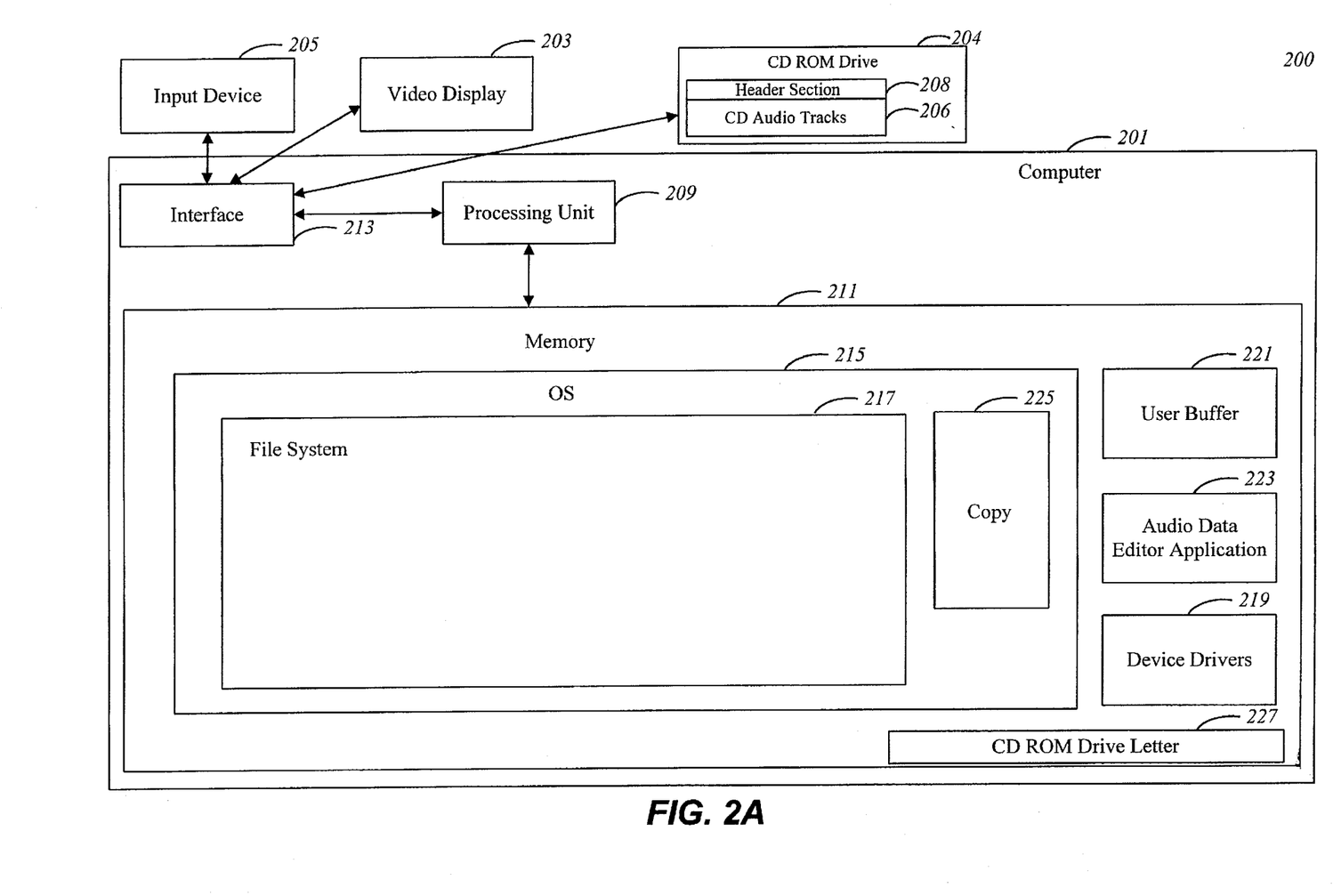
FIG. 2A is a block diagram of a computer system for practicing a preferred embodiment of the present invention.

FIG. 2A is a block diagram of a computer system 200 for practicing a preferred embodiment of the present invention. The computer system 200 includes a computer 201, a video display device 203, an input device 205, such as a keyboard, mouse, or pointing device, and a CD ROM drive 207, which contains CD audio tracks. The computer 201 also includes a processing unit 209, a computer memory 211, and an interface 213 for enabling communication between the processing unit 209 and peripheral devices (e.g., the video display device 203, the input device 205, and the CD ROM drive 207).

The computer memory 211 includes a number of components, including the operating system (OS) 215 that is responsible for controlling allocation and usage of system resources such as memory 211, central processing unit 209, and CD ROM drive 207. A typical operating system is MS-DOS by Microsoft Corporation of Redmond, Washington. The operating system 215 includes a file system 217. The file system 217 translates requests for file operations from an application program into low-level tasks that can be understood by device drivers 219 that control the peripheral devices. The other components of the computer memory 211 are described in more detail below.

Figure 3:
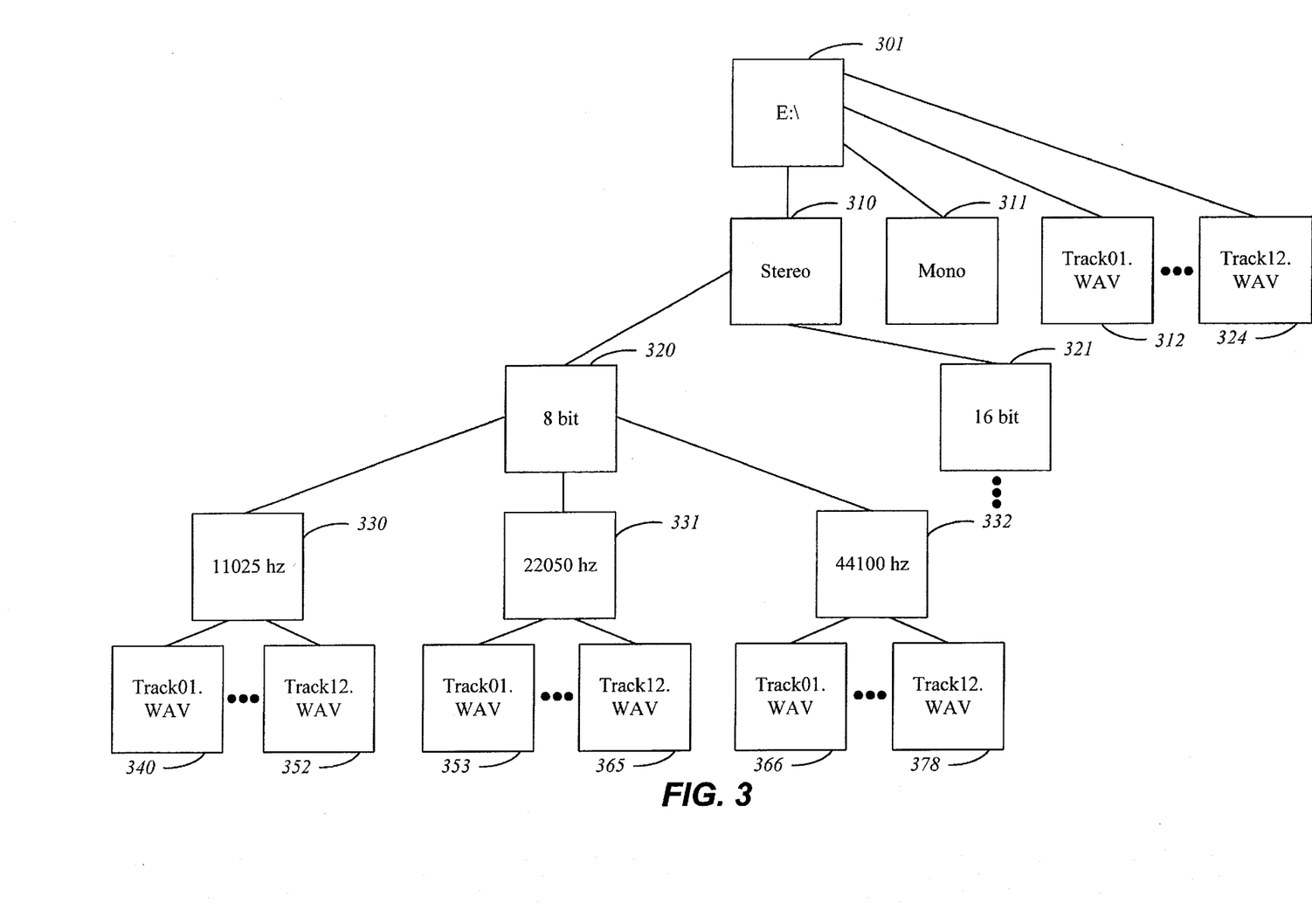
FIG. 3 illustrates a directory hierarchy of an audio drive.

The file system 217 dynamically creates a directory hierarchy to identify various fidelity levels when a CD ROM is loaded into the CD ROM drive 207. For example, if the user loads a CD ROM containing twelve compositions, the file system 217 creates a root directory "E" 301 that contains twelve files 312–324 and two sub-directories 310 and 311 as shown in FIG. 3. The twelve files, named "track01.wav" through "track12.wav," each correspond to one of the twelve tracks of the CD ROM at the original fidelity level. The sub-directory "stereo" is the start of the path that contains the logical files in stereo fidelity, and the sub-directory "mono" is the start of the path that contains the logical files in mono fidelity. Both the "stereo" and "mono" sub-directories contain sub-directories 320 and 321 named "8 bit" and "16 bit." The sub-directories "8 bit" and "16 bit" start paths that contain logical files with 8-bit and 16-bit samples, respectively. Each sub-directory named "8 bit" and "16 bit" contains three sub-directories 330, 331, and 332 named "11025 hz," "22050 hz," and "44100 hz." Each of these sub-directories contains logical files with data at the sampling rate corresponding to its pathname. Each of these three sub-directories contain twelve files named "track01.wav" through "track 12.wav" (see elements 340–378). Each of these twelve files corresponds to a track of the CD ROM at the fidelity level identified by the pathname. (FIG. 3 shows the hierarchy for the "stereo" "8 bit" sub-directory.) For example, the file 352, identified by the pathname "E\stereo\8 bit\11025 hz\track12.wav", is a logical file that contains the audio data of track 12 of the CD ROM loaded in drive "E:" at the fidelity level characterized as in stereo with 8-bit samples and at a sampling rate of 11025 Hz. To access a composition of the CD ROM at a particular fidelity, an editor application preferably specifies a corresponding complete pathname of the logical file name.

Figure 2B:
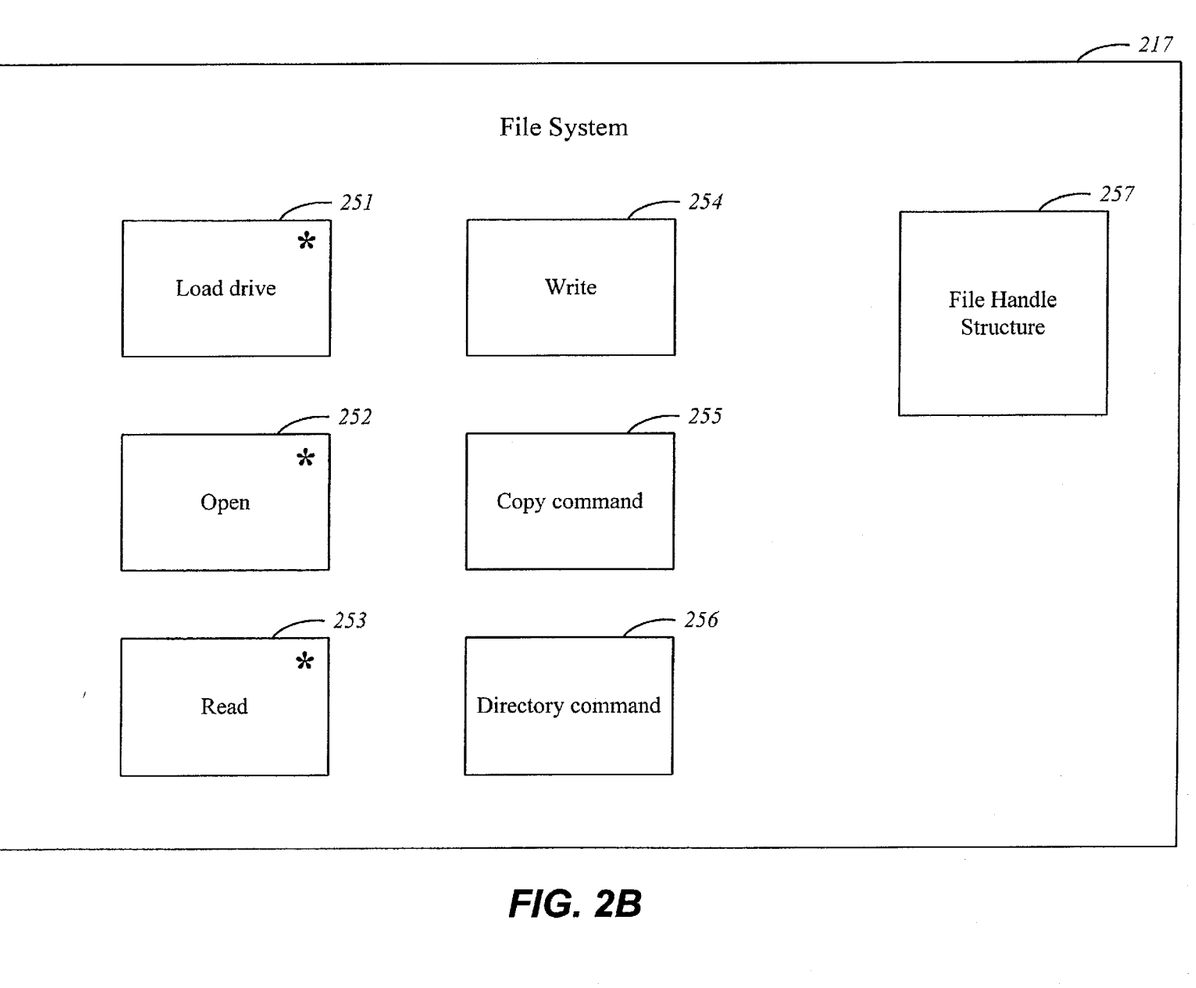
FIG. 2B is a block diagram illustrating the components of a file system in a preferred embodiment.

FIG. 2B is a block diagram illustrating the components of the file system in a preferred embodiment. The file system contains a load drive routine 251, an open routine 252, a read routine 253, a write routine 254, a copy routine 255, a directory routine 256, and a file handle structure 257. The load drive routine, the open routine, the file handle structure, and the read routine are preferably modified (as indicated by the asterisks) to support audio drives in accordance with the preferred embodiment. The remaining components of the file system are preferably unchanged from a standard file system. Each of the illustrated components of the file system 217 is discussed in more detail below.

The present invention is preferably implemented by modifying various routines of a prior art file system. In particular, the load drive, the open, and the write routines are modified to accommodate logical files and the audio directory structure. These routines operate like routines of prior art file systems, except when handling CD ROM drives. When a CD ROM drive is loaded, the load drive routine generates an audio drive directory hierarchy for specifying fidelity levels. When a logical file is opened, the open routine generates a file handle structure (FHS) that indicates the fidelity level of the logical file. When a logical file is read, the read routine dynamically generates header data and raw audio data at the fidelity level specified in the FHS.

Figure 4:
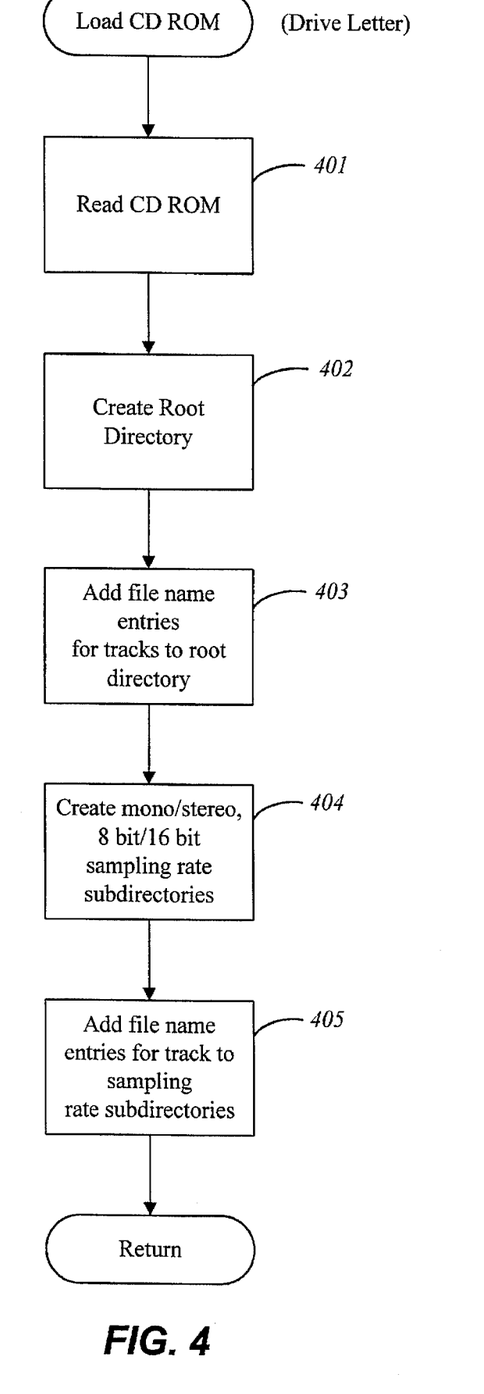
FIG. 4 is a flow diagram illustrating a preferred load drive routine.

FIG. 4 is a flow diagram illustrating the load drive routine for a CD ROM drive. The load drive routine receives as an input parameter a CD ROM drive letter 227 that is to be assigned to the CD ROM drive. The load drive routine then creates an audio directory to specify fidelity levels. In step 401, the routine reads a header section 206 of the CD ROM to determine the number of tracks on the CID ROM. In step 402, the routine creates the root directory liar the specified drive letter. In step 403, the routine adds a file entry to the root directory for each track contained on the CD ROM drive. In a preferred embodiment, the file names are in the format "trackxx.wav" where "xx" refers to the track number that the file name represents and the extension ".wav" indicates that the file is in a standard editing format, such as the RIFF format. In step 404, the routine creates the audio sub-directory hierarchy to represent the various fidelity levels. In a preferred embodiment, the audio directory indicates mono/stereo, 8-bit/16-bit samples, and various sampling rates. One skilled in the art would appreciate that other directory organizations can be used to represent the various fidelity levels. For example, the root directory of the audio drive could contain sub-directories corresponding to the sampling rate which in turn contain sub-directories for mono and stereo. Alternatively, various sub-directories could be combined. For example, if only mono fidelity levels were represented, then the sub-directory level corresponding to mono and stereo could be eliminated. In step 405, the routine adds a file entry for each track to each fidelity level sub-directory. The routine then returns.

After a CD ROM drive is loaded, standard file commands can be used to view the audio directory. For example, if a user enters the MS-DOS directory command "dir E:\stereo\16 bit\11025 hz*.*", then the user would see a file name for each logical file in the sub-directory. As discussed above, the file names are preferably in the format "trackxx.wav." Similarly, the user may use a standard file system copy command to create an actual copy of a logical audio file. For example, if a user enters "copy E:\stereo\16 bit\11025 hz\track05.wav C:\temp.wav," then the file system will create a copy of the audio data of track 5 at a fidelity level characterized as in stereo with 16-bit samples and a sampling rate of 11025 Hz on drive "C:" in a file named "temp.wav".

Figure 5:
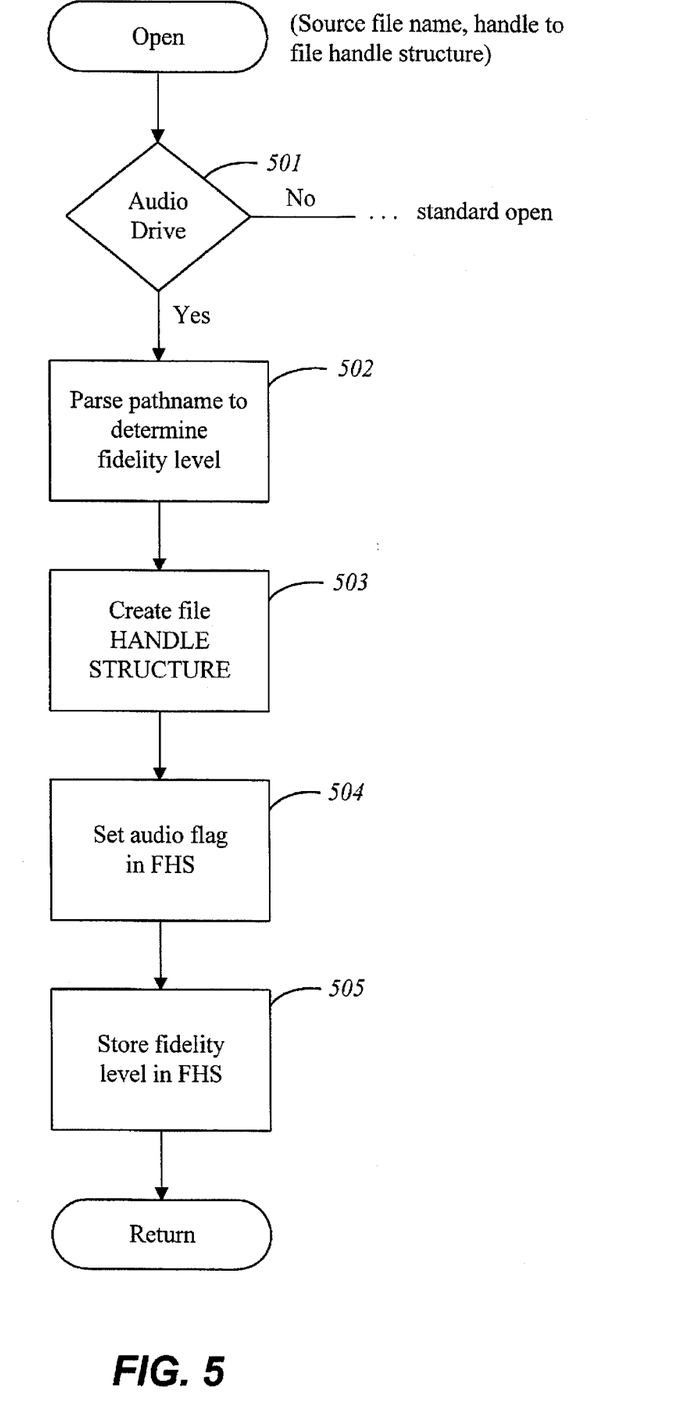
FIG. 5 is a flow diagram illustrating a preferred open routine.

FIG. 5 is a flow diagram of the open routine in a preferred embodiment. The open routine is passed a name of a source file and returns a handle to a file handle structure for that source file. In step 501, if the file to be opened is on an audio drive, then the routine continues at step 502, else the routine continues with the standard (i.e., prior art) processing for opening a nonaudio file. In step 502, the routine parses the pathname to determine the fidelity level. In step 503, the routine creates a file handle structure in a manner that is analogous to the creation of standard file handle structures. The term "standard" refers to methods and structures used in the prior art. The file handle structure contains an indication that the source file is on an audio drive and contains the original fidelity level of the file. In step 504, the routine sets the audio flag in the file handle structure. In step 505, the routine stores the original fidelity level in the file handle structure and returns.

Figure 6:
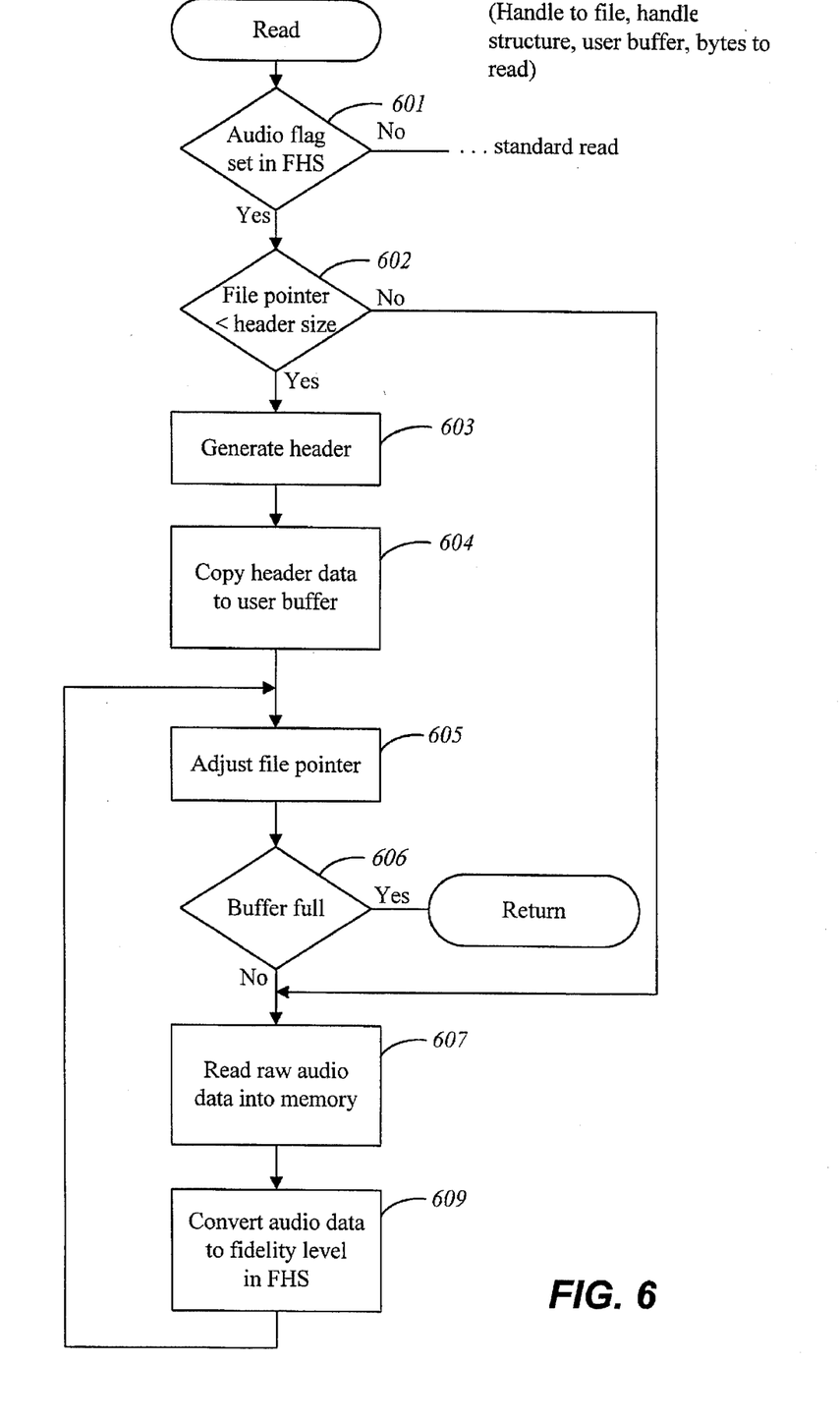
FIG. 6 is a flow diagram illustrating a preferred read routine.

FIG. 6 is a flow diagram of the read routine in a preferred embodiment. The read routine reads data from a designated source file and stores the data in a user buffer. The read routine is passed the file handle structure for the source file, the user buffer, and a count of the number of bytes to read. When the designated source file is a logical file, then the read routine dynamically generates the audio data at the fidelity level that corresponds to the pathname. A logical file has a header followed by audio data at a certain fidelity level. A current file pointer that is maintained by the file system points to the current position in the logical file. When the current file pointer points into the header, then the routine dynamically generates the header information. When the current file pointer points to the audio data portion of the file, the routine converts the raw data from the CD ROM drive to the fidelity level specified in the file handle structure. In step 601, if the audio flag is set in the file handle structure, then the file is on an audio drive and the routine continues at step 602, else the routine continues with the standard read processing for non-audio drives. In steps 602 through 605, the routine simulates that the logical file contains a header for a standard editing format, when the actual raw data on the CD ROM drive has no header. The read routine determines whether the data is being accessed within the header. If data is being accessed within the header, then the routine generates the header data and copies header data to the user buffer. In step 602, if the current file pointer is less than the header size, then the read routine will access the header, and the routine continues at step 603, else the routine continues at step 607. In step 603, the routine dynamically generates the header data in the appropriate format, such as the RIFF format. The header data is generated from data retrieved from the table of contents of the CD ROM. In an alternate embodiment, the header data can be generated once when a logical file is first opened and accessed by the read routine without having to regenerate the header data. In step 604, the routine copies the generated portion of the header data to the user buffer. In step 605, the routine adjusts the current file pointer to the next available location in the user buffer past the copied data. In steps 605 through 609, the routine loops reading raw data from the CD ROM drive and converting the raw data to data at the specified fidelity level. The raw data is converted to the specified fidelity level using any well known technique for converting data from one fidelity level to another. In step 606, if the user buffer is full, then the routine returns, else the routine continues at step 607. In step 607, the routine reads a block of raw audio data from the CD ROM drive into memory. In step 609, the routine converts the audio data to audio data at the fidelity level specified in the file handle structure and stores the converted data into the user buffer. For example, if the raw audio data is taken at a sampling rate of 44100 Hz and the fidelity level specified in the file handle structure is 11025 Hz, then the routine may generate one-quarter the samples with appropriate smoothing. After completion of step 609, processing continues with step 605.

While the preferred embodiment has been described in terms of providing tracks of audio data at specified fidelity levels, those of ordinary skill in the art will understand that the present invention can also retrieve one or more extents or subsets of raw audio data on the CD ROM.

Although the present invention has been described in terms of a preferred embodiment, it is not intended that the invention be limited to this embodiment. While the preferred embodiment uses logical files that are generated dynamically, one skilled in the art would appreciate that the use of the directory hierarchy could be used to specify the fidelity level of files that actually exist. Also, the present invention can be implemented as a device driver for an audio drive. The scope of the invention is defined by the claims which follow.

We claim:

1. A method in a computer system for providing to a file system a specification of a parameter received from a user of the computer system, the computer system having an application computer program for receiving a pathname to a file from the user and for requesting the file system to perform a service with the file specified by the received pathname, the method comprising:

receiving a pathname having a directory specification that indicates the parameter to be provided to the file system, wherein no file exists in the file system with the created pathname;

sending the received pathname to the file system;

under control of the application computer program,
receiving the sent pathname; and
sending the received pathname to the file system; and under control of the file system,
receiving the sent pathname;
determining the parameter indicated in the received pathname; and
using the parameter to control performing the service wherein a new parameter can be defined and provided to the file system without modifying the application computer program.

2. The method of claim 1 wherein the application computer program is an audio computer program and wherein the parameter indicates a fidelity level of audio data to be provided to the computer program.

3. In a computer system having an application computer program that calls a service computer program, the service computer program having a calling interface with a file pathname argument, a method for providing a new implementation of the service computer program to the application computer program without changing the application computer program, the new implementation of the service computer program performing a new task using additional information not provided to previous implementations of the service computer program by the application computer program, the method comprising the steps of:

creating a pathname that does not correspond to a file, the pathname representing an encoding of the additional information to be used by the new implementation of the service computer program;

sending the created pathname to the application computer program;

under control of the application computer program,
receiving the sent pathname; and
calling the service computer program from the application computer program, passing to the service computer program the received pathname as the file pathname argument; and under control of the new implementation of the service computer program,
receiving the passed pathname;
parsing the received pathname to extract the additional information; and
performing the desired task using the additional information.

4. A computer-readable storage device containing instructions for controlling a computer system to perform receiving a pathname that indicates a fidelity level and indicates a file containing audio data in an original fidelity level; and upon receiving the pathname, dynamically converting the audio data from the original fidelity level to the fidelity level indicated by the received pathname.

5. A method in a computer system for providing audio data at a specified fidelity level, the method comprising:

receiving a pathname indicating the specified fidelity level and indicating a file containing audio data in an original fidelity level; and upon receiving the pathname, dynamically converting the audio data from the original fidelity level to the fidelity level specified by the received pathname.

6. A computer-readable storage device containing instructions for controlling a computer system to access audio data at a specified fidelity level, the audio data being stored on a storage device in an original fidelity level, the instructions for controlling a computer system implementing the steps of:

generating a directory hierarchy for indicating the fidelity levels of audio data, the directory hierarchy having sub-directory levels, each sub-directory level representing a characteristic of fidelity, the directory hierarchy including leaf sub-directories;

generating a file entry for each leaf sub-directory, each file entry representing a logical file containing audio data and having a pathname representing the fidelity level of the audio data; and when accessing a file represented by a generated file entry, converting the audio data from the original fidelity level to the fidelity level represented by the pathname of the file.

7. A method executed in a computer system for accessing audio data at a specified fidelity level, the audio data being stored on a storage device in an original fidelity level, the method comprising the steps of:

generating a directory hierarchy for indicating the fidelity levels of audio data, the directory hierarchy having sub-directory levels, each sub-directory level representing a characteristic of fidelity, the directory hierarchy including leaf sub-directories;

generating a file entry for each leaf sub-directory, each file entry representing a logical file containing audio data and having a pathname representing the fidelity level of the audio data; and when accessing a file represented by a generated file entry, converting the audio data from the original fidelity level to the fidelity level represented by the pathname of the file.

8. The method of claim 1 wherein the directory hierarchy includes:

a first sub-directory level with sub-directory names that indicate number of channels of audio data;

a second sub-directory level with sub-directory names that indicate sampling rate of audio data; and a third sub-directory level with sub-directory names that indicate number of bits per sample of audio data.

9. A method executed in a computer system for providing audio data at a specified fidelity level, the computer system including a storage device for storing raw audio data, the method comprising the steps of:

for each of a plurality of fidelity levels,
providing a file entry in a hierarchical directory structure, the file entry representing a logical file containing audio data at the fidelity level;
providing a logical file being stored in a sub-directory of the hierarchical directory structure, the logical file having a pathname within the hierarchical directory structure, wherein the pathname specifies the fidelity level of the audio data of the logical file; and in response to a request to read the audio data from the logical files:
retrieving the raw audio data; and
converting the raw audio data to the fidelity level specified by the pathname of the logical file.

10. The method of claim 9 wherein the directory hierarchy includes sub-directories with names that indicate number of channels of audio data, sampling rate of audio data, and number of bits per sample of audio data.

11. A method in a computer system for accessing audio data at one of a plurality of fidelity levels, the audio data having an original fidelity level, the method comprising the steps of:

receiving the audio data at the original fidelity level;
for each of the plurality of fidelity levels,
creating a directory corresponding to the fidelity level; and
representing the audio data as a file in the created directory;

when accessing the audio data at a certain fidelity level,
specifying the directory corresponding to the certain fidelity level; and
specifying the file that represents the audio data in the specified directory; and when accessing the audio data at the certain fidelity level,
reading the received audio data at the original fidelity level; and
converting the read audio data to audio data of the certain fidelity level.

12. A method in a computer system for organizing audio data into a plurality of fidelity levels, the method comprising the steps of:

creating a directory for each fidelity level;

adding a file entry to the created directories, the file entry representing a file that logically contains the audio data at the fidelity level corresponding to the fidelity level of the directory;

when accessing the audio data at a certain fidelity level, specifying the directory and file entry corresponding to the audio data at the certain fidelity level; and dynamically generating the audio data at the certain fidelity level in response to the step of specifying.

13. A computer system for specifying a plurality of fidelity levels through which to access audio data, the audio data being stored on a storage device, the system comprising:

a directory generator for generating a directory hierarchy for specifying a fidelity level of audio data, the directory hierarchy having sub-directories that correspond to characteristics of fidelity and a fidelity level represented by a pathname of sub-directories;

a pathname selector for selecting a pathname; and a data generator for dynamically generating the audio data at the fidelity level represented by the selected pathname.

14. A method in a computer system for dynamically generating audio data in a specified format, the method comprising the steps of:

receiving audio data in an original format;

receiving a request to read a portion of the audio data in the specified format; and in response to receiving the request,
converting the portion of the audio data in the original format to audio data in the specified format; and
providing the converted portion of the audio data wherein the audio data in the specified format is dynamically generated in response to receiving the request.

15. A computer system for indicating a fidelity level at which to access audio data, the computer system comprising:

means for storing audio data in an original fidelity level;

means for generating a directory hierarchy that includes a file representing audio data, the file being identified by a pathname within the directory hierarchy, the pathname indicating the fidelity level corresponding to the file;

means for receiving the pathname of the file; and means for converting the audio data stored in the original fidelity level into the fidelity level indicated by the received pathname.

16. A method in a computer system for specifying an indication of a fidelity level of audio data, the computer system having an audio computer program that receives a pathname to a file containing audio data and that requests a file system to retrieve the audio data from the file specified by the pathname, the method comprising:

creating a pathname having a directory specification that indicates the fidelity level of the audio data to be retrieved and having a filename;

sending the created pathname to the audio computer program;

under control of the audio computer program,
receiving the sent pathname; and
sending the received pathname to the file system; and under control of the file system,
receiving the sent pathname;
determining the fidelity level indicated in the received pathname;
converting audio data from one fidelity level to the determined fidelity level; and
sending the converted audio data to the audio computer program for processing by the audio computer program.

17. A computer-readable storage device containing instructions for controlling a computer system to organize audio data into a plurality of fidelity levels, the instructions for controlling a computer system implementing the steps of:

creating a directory for each fidelity level;

adding a file entry to the created directories, the file entry representing a file that logically contains the audio data at the fidelity level corresponding to the fidelity level of the directory;

when accessing the audio data at a certain fidelity level, specifing the directory and file entry corresponding to the audio data at the certain fidelity level; and dynamically generating the audio data at the certain fidelity level in response to the step of specifying.

18. In a computer system having an application computer program that calls a service computer program, the service computer program having a calling interface with a file pathname argument, a computer-readable storage device containing instructions for controlling a computer system to provide a new implementation of the service computer program to the application computer program without changing the application computer program, the new implementation of the service computer program performing a new task using additional information not provided to previous implementations of the service computer program by the application computer program, the instructions for controlling a computer system specifying the steps of:

creating a pathname that does not correspond to a file, the pathname representing an encoding of the additional information to be used by the new implementation of the service computer program;

sending the created pathname to the application computer program;

under control of the application computer program,
receiving the sent pathname; and
calling the service computer program from the application computer program, passing to the service computer program the received pathname as the file pathname argument; and under control of the new implementation of the service computer program,
receiving the passed pathname;
parsing the received pathname to extract the additional information; and
performing the desired task using the additional information.

\* \* \* \* \*